UNITED STATES PATENT OFFICE.

ALICE MARION HART, OF CHELSEA, LONDON, ENGLAND.

PROCESS OF RENDERING RAMIE AND OTHER FABRICS WATER-REPELLENT AND COLORING THE SAME.

984,665.     Specification of Letters Patent.     Patented Feb. 21, 1911.

No Drawing.     Application filed May 1, 1909. Serial No. 493,317.

*To all whom it may concern:*

Be it known that I, ALICE MARION HART, widow, a subject of the King of Great Britain and Ireland, residing at Chelsea, in the county of London, England, have invented a new or Improved Process of Rendering Ramie and other Fabrics Water-Repellent and Coloring the Same, of which the following is a specification.

Owing to the extremely absorbent character of the ramie fiber it has hitherto been found difficult to render it resistant to water. By this new process this difficulty has been overcome by submitting ramie yarns, ramie and other like fabrics, to the treatment hereinafter described. If ramie yarns be so treated and are afterward woven close and firm, a material is produced which it is impossible to saturate with water, and therefore becomes of great value for tarpaulins and the like, and for varied requirements especially of the army and navy. These yarns and fabrics by this process can be dyed any color by the use of cheap dry pigment, without the application of dye stuffs, the particles of color being conveyed into the very structure of the fiber. The same treatment is successful with other yarns and textiles such as cotton, linen, jute and the like.

In carrying out this invention, the dry pigment is first prepared by boiling in water for about one hour, the coloring matter is then allowed to settle, the surplus water decanted, and the residue dried with gentle heat, leaving it ready for use.

The following is the mixture, in or about the proportions given, for the treatment of the yarns and fabrics. Take of gum tragasol, one pound and work into it an equal weight of water. Mix three pounds of casein slowly with water till quite smooth. Add the casein to the gum, and work in one pint of sweet oil, and half a pint of caustic soda Twaddell 17. Finally mix one pound of the dry color into a smooth paste with water and add it to the mixture, then bring up the whole with water to two gallons in amount. Boil the mixture for about one hour, stirring the whole time. The yarns and fabrics are passed through the mixture, then through rollers into a bath of water containing 15 per cent. of alum, thence into a trough of clean water, and again through rollers, and then dried by hanging up.

If colored or white goods are treated the pigment is omitted.

What I claim, and desire to secure by Letters Patent of the United States, is:—

The herein described process of waterproofing consisting of the treatment of fabrics by passing them through a mixture of gum tragasol, casein, sweet oil, caustic soda and dry color, then through a solution of alum, then through clean water, and finally drying same, substantially as described.

In testimony whereof I have signed my name to this specification in the presence of two subscribing witnesses.

ALICE MARION HART.

Witnesses:
GEORGE ROYLE,
H. D. JAMESON.